(12) United States Patent
Good et al.

(10) Patent No.: US 8,272,925 B2
(45) Date of Patent: Sep. 25, 2012

(54) MULTI-DRUM SANDER AND/OR RASP

(75) Inventors: Mark Good, Cary, IL (US); Dan Swanson, Lombard, IL (US); Wayne Bower, Wilmette, IL (US)

(73) Assignee: Sears Brands, L.L.C.

( * ) Notice: Subject to any disclaimer, the term of this patent is extended or adjusted under 35 U.S.C. 154(b) by 341 days.

(21) Appl. No.: 12/683,742

(22) Filed: Jan. 7, 2010

(65) Prior Publication Data

US 2010/0173572 A1   Jul. 8, 2010

Related U.S. Application Data

(60) Provisional application No. 61/143,016, filed on Jan. 7, 2009.

(51) Int. Cl.
*B24B 27/08* (2006.01)

(52) U.S. Cl. .......... 451/358; 451/65; 451/194; 451/359; 451/361

(58) Field of Classification Search ................. 451/358, 451/65, 194, 359, 361, 182, 184, 913, 311, 451/489
See application file for complete search history.

(56) References Cited

U.S. PATENT DOCUMENTS

| | | | | |
|---|---|---|---|---|
| 335,117 | A * | 2/1886 | Boardman et al. | 451/131 |
| 532,348 | A * | 1/1895 | Clough et al. | 451/150 |
| 1,847,299 | A | 3/1932 | Eaglesfield | 451/504 |
| 1,936,991 | A * | 11/1933 | Pinkney | 451/65 |
| 1,977,088 | A * | 10/1934 | Richardson | 451/358 |
| 2,534,101 | A * | 12/1950 | Bongiorni | 15/93.1 |
| 3,098,282 | A * | 7/1963 | Robertson | 407/29.12 |
| 3,793,782 | A * | 2/1974 | Bowling | 451/358 |
| 3,815,290 | A * | 6/1974 | McDowell | 451/358 |
| 4,560,006 | A | 12/1985 | Sjoberg | |
| 4,685,181 | A | 8/1987 | Schwartz | |
| 4,720,940 | A | 1/1988 | Green | |
| 4,941,246 | A | 7/1990 | Finnegan | |
| 4,941,290 | A * | 7/1990 | Holyoke | 451/182 |
| 5,016,398 | A * | 5/1991 | Fukunaga | 451/194 |
| 5,254,036 | A | 10/1993 | Johnson et al. | |
| 5,495,796 | A | 3/1996 | Mueller | |
| 5,531,636 | A | 7/1996 | Bissen | |
| 5,567,197 | A * | 10/1996 | Evensen | 451/358 |
| 5,607,348 | A * | 3/1997 | Lopez | 451/194 |
| 5,628,675 | A * | 5/1997 | Brown et al. | 451/49 |
| 5,672,096 | A * | 9/1997 | Amarosa et al. | 451/504 |
| 5,679,056 | A | 10/1997 | Coussens | |
| 5,842,913 | A | 12/1998 | Nemazi | |
| 5,919,086 | A * | 7/1999 | Derry | 460/72 |
| 5,921,854 | A * | 7/1999 | Evensen | 451/504 |
| 5,947,806 | A | 9/1999 | Rhoads | |
| 6,193,592 | B1 * | 2/2001 | Grupe | 451/344 |
| 6,234,887 | B1 * | 5/2001 | Hundebøl | 451/358 |
| 6,264,553 | B1 | 7/2001 | Neumann et al. | |
| 6,645,054 | B2 | 11/2003 | Raffo, Sr. | |
| 6,685,545 | B2 * | 2/2004 | Chuang | 451/155 |

(Continued)

*Primary Examiner* — George Nguyen

(74) *Attorney, Agent, or Firm* — McAndrews, Held & Malloy, Ltd.

(57) ABSTRACT

Described herein is technology for, among other things, a multi-purpose sanding or filing apparatus. The apparatus includes a motor, a plurality of drive mechanisms in mechanical communication with the motor, and a plurality of drums, where each of the drums has an axis passing therethrough, the drums are coupled with respective drive mechanisms, and the drive mechanisms are operable to rotate the drums about their respective axes.

15 Claims, 5 Drawing Sheets

U.S. PATENT DOCUMENTS

| | | | |
|---|---|---|---|
| 6,932,680 B1 * | 8/2005 | Collins | 451/69 |
| 7,140,957 B2 * | 11/2006 | Thysell et al. | 451/350 |
| 7,261,623 B1 * | 8/2007 | Palushi | 451/350 |
| 7,427,228 B1 * | 9/2008 | Kirsch | 451/357 |
| 2009/0083916 A1 * | 4/2009 | Lampka et al. | 15/3.53 |
| 2010/0151776 A1 * | 6/2010 | Cheng et al. | 451/359 |
| 2010/0173572 A1 * | 7/2010 | Good et al. | 451/464 |
| 2011/0230126 A1 * | 9/2011 | Boutaghou | 451/527 |

* cited by examiner

MULTI-DRUM SANDER AND/OR RASP

CLAIM OF PRIORITY UNDER 35 U.S.C. §119

The present application for patent claims priority to Provisional Application No. 61/143,016 entitled "Multi-Drum Sander and/or Rasp" filed Jan. 7, 2009, and assigned to the assignee hereof and hereby expressly incorporated by reference herein.

BACKGROUND

1. Field

Embodiments of the present invention generally relate to the field of power tools.

2. Background

In the power tool field, various types of sanding apparatuses such as power drum sanders and power rasps are all known. For example, U.S. Pat. Nos. 4,720,940, 5,842,913, 6,645,054, 5,679,056, 5,947,806, 5,531,636, 5,254,036, 4,560,006, 6,264,553, 4,941,246, 4,685,181, and 5,495,796—the disclosures of which are hereby expressly incorporated within—each disclose examples of conventional sanding apparatuses. However, there currently does not exist a compact, portable, hand-held power sander or power rasp.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, a multi-purpose sanding or filing apparatus. The apparatus includes a motor, a plurality of drive mechanisms in mechanical communication with the motor, and a plurality of drums, where each of the drums has an axis passing therethrough, the drums are coupled with respective drive mechanisms, and the drive mechanisms are operable to rotate the drums about their respective axes.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
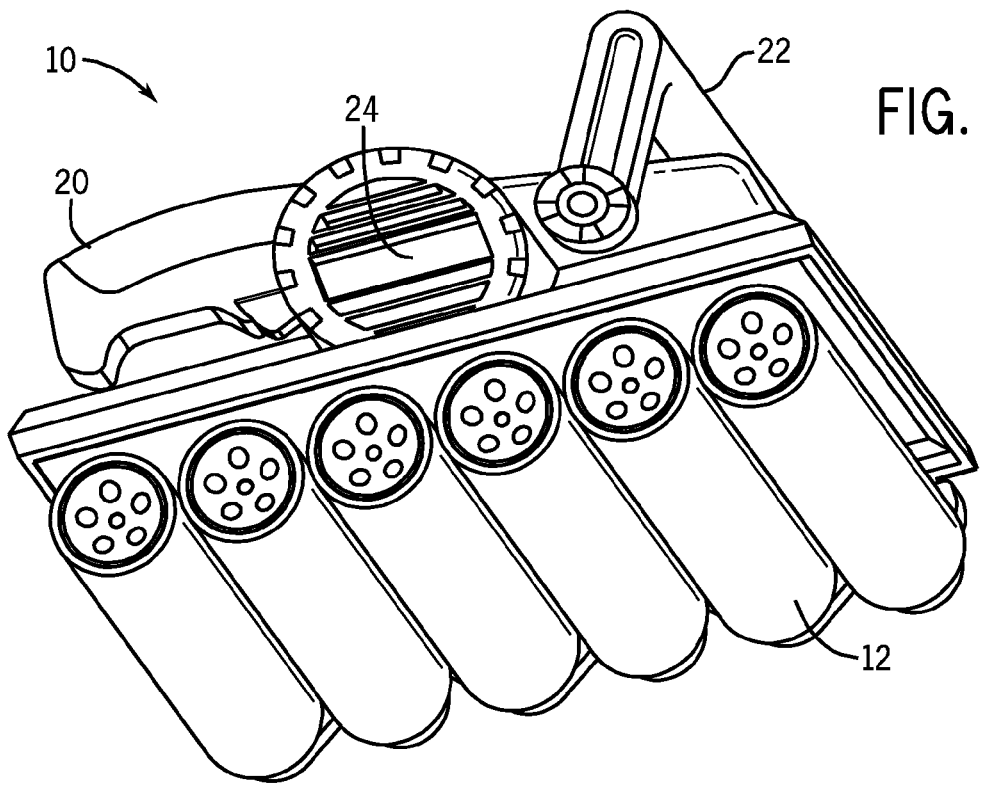
FIG. 1 is an isometric view of a sanding and/or filing apparatus, in accordance with various embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

Generally speaking, embodiments provide for a single- or variable-speed, portable, handheld sanding apparatus having multiple drums. The drums may include, but are not limited to, sander drums and rasp drums.

FIGS. 1-6 illustrate various views of a sanding apparatus 10 in accordance with various embodiments of the present invention. Generally, the sanding apparatus includes a motor housing 24 having a motor disposed therein, a front handle 22, and a rear handle 20. The motor is operable to drive a plurality of drive mechanisms. The drive mechanisms are coupleable to a plurality of drums 12. In one embodiment, the drums 12 are interchangeable so that the sanding apparatus 10 may be converted from a drum sander to a power rasp.

In one embodiment, the direction which the drive mechanisms rotate the drums may be switched from clockwise to counter-clockwise, and vise versa. Moreover, each drive mechanism 26 or, alternatively, groups of drive mechanisms 26, may be switched independently from the other drive mechanisms. Thus it is possible for some of the drums 12 to be rotated in the clockwise direction while others are rotated in the counter-clockwise direction. This is advantageous because torque transmitted from the sanding apparatus 10 to the user is significantly reduced.

In one embodiment, each drive mechanism is positioned to the side of the attached drum 12. In another embodiment, the drive mechanisms 26 may bisect the drums 12. The drive mechanisms 26 may incorporate solid shafts, a compressible rubber cylinders, pneumatic cylinders, splines, keys, belts and pulleys, or the like.

Figure 2:
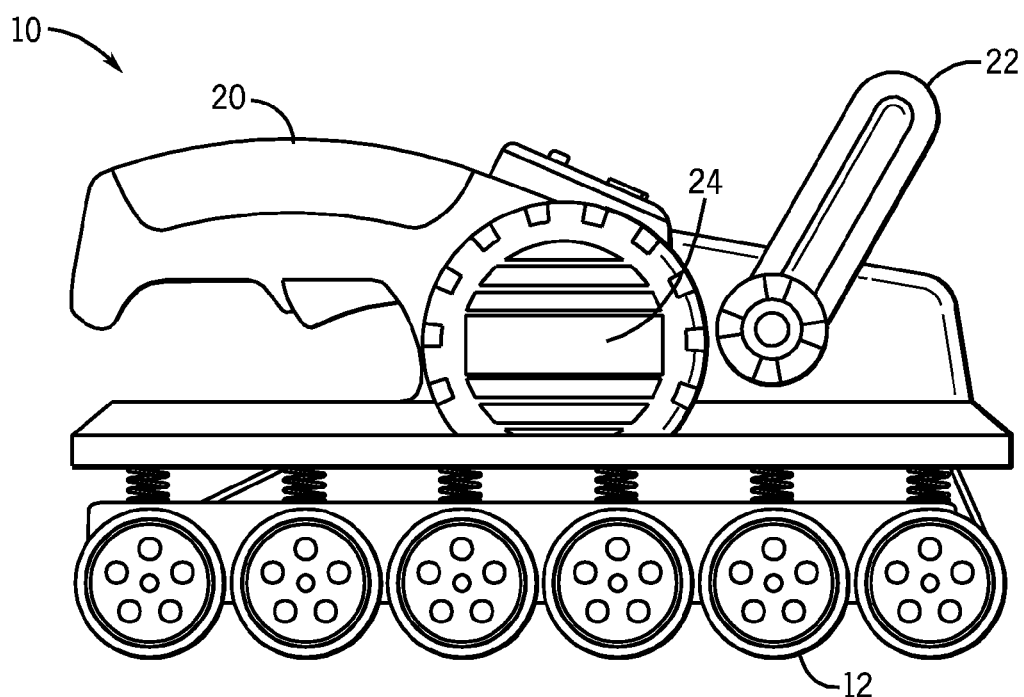
FIG. 2 is a side view of a sanding and/or filing apparatus, in accordance with various embodiments of the present invention.
Figure 3:
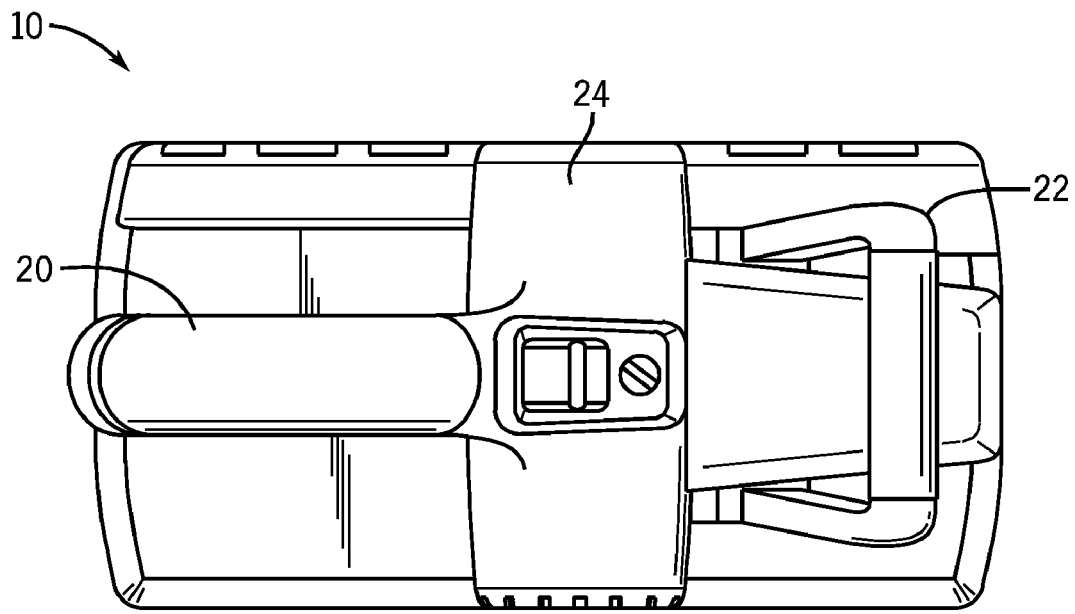
FIG. 3 is a top view of a sanding and/or filing apparatus, in accordance with various embodiments of the present invention.
Figure 4:
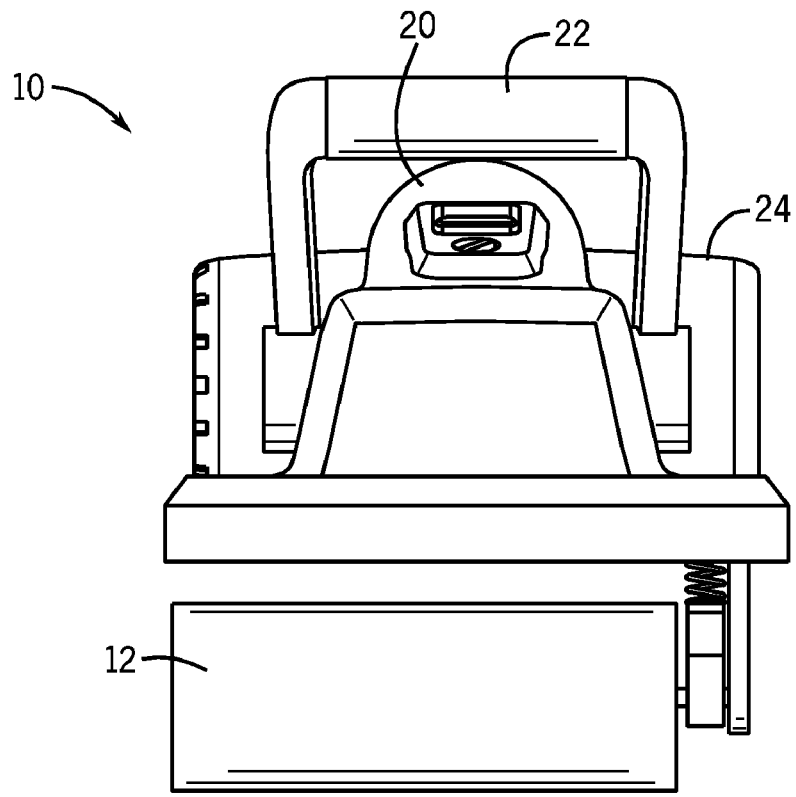
FIG. 4 is a front view of a sanding and/or filing apparatus, in accordance with various embodiments of the present invention.
Figure 5:
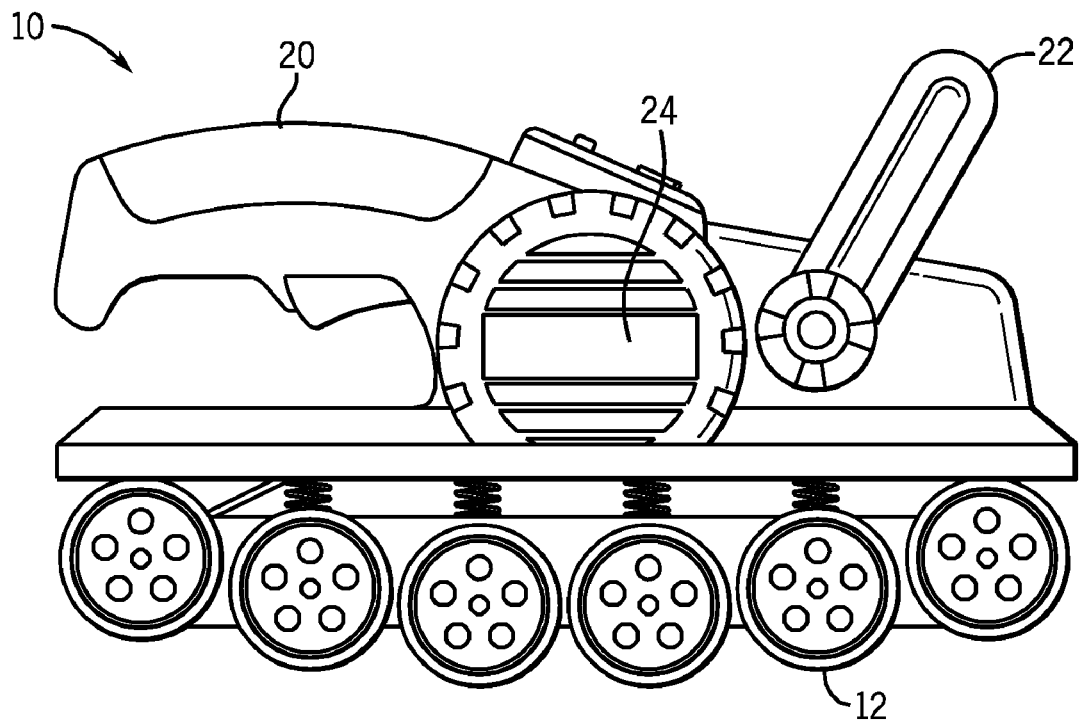
FIG. 5 is a side view of a sanding and/or filing apparatus, showing the drums in a convex orientation relative to each other, in accordance with various embodiments of the present invention.
Figure 6:
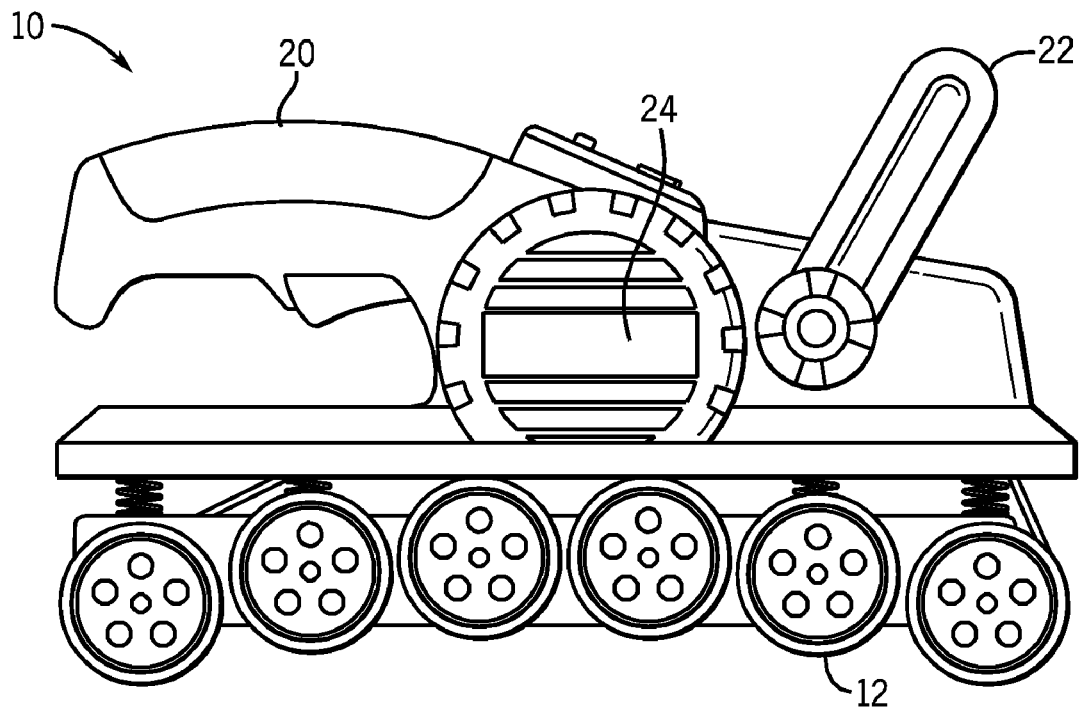
FIG. 6 is a side view of a sanding and/or filing apparatus, showing the drums in a concave orientation relative to each other, in accordance with various embodiments of the present invention.

In one embodiment, the drive mechanisms, and thus the drums 12, may be fixed in a linear orientation relative to each other, such as is depicted in FIG. 2. In another embodiment, the drive mechanisms, and thus the drums 12, may be vertically suspended relative to the main body of the sanding apparatus, so that the drive mechanisms 26 and drums 12 may be adjusted in the vertical direction. In still another embodiment, the drive mechanisms, and thus the drums 12, may be vertically suspended relative to the main body of the sanding apparatus, so that the drive mechanisms 26 and drums 12 may freely move in the vertical direction in order to dynamically adjust to the contour of a non-planar surface. For example, in FIG. 5, the drums 12 have adjusted to a convex orientation so as to conform to a concave surface, while in FIG. 6, the drums 12 have adjusted to a concave orientation so as to conform to a convex surface. In yet another embodiment, the drive mechanisms 26 may be switchable between the aforementioned fixed and suspended configurations.

The disconnection and attachment of the interchangeable drums 12 may be implemented in a number of ways. For example, the sanding apparatus 10 may include a shaft extending laterally from the drive mechanisms, and each drum 12 may also include a longitudinal through-hole sized and shaped so that the drums 12 can be slid over the shafts and the secured thereto with a nut or other suitable fastener. Alternatively, the rotating shafts may each comprise expanding mandrels, which expand to lock the drums into place upon the insertion of a bolt therein. In still other embodiments, the drums 12 may include a latch, cartridge, or other type of quick-connect mechanism to enable convenient connection to and disconnection from the drive mechanisms.

Figure 7:
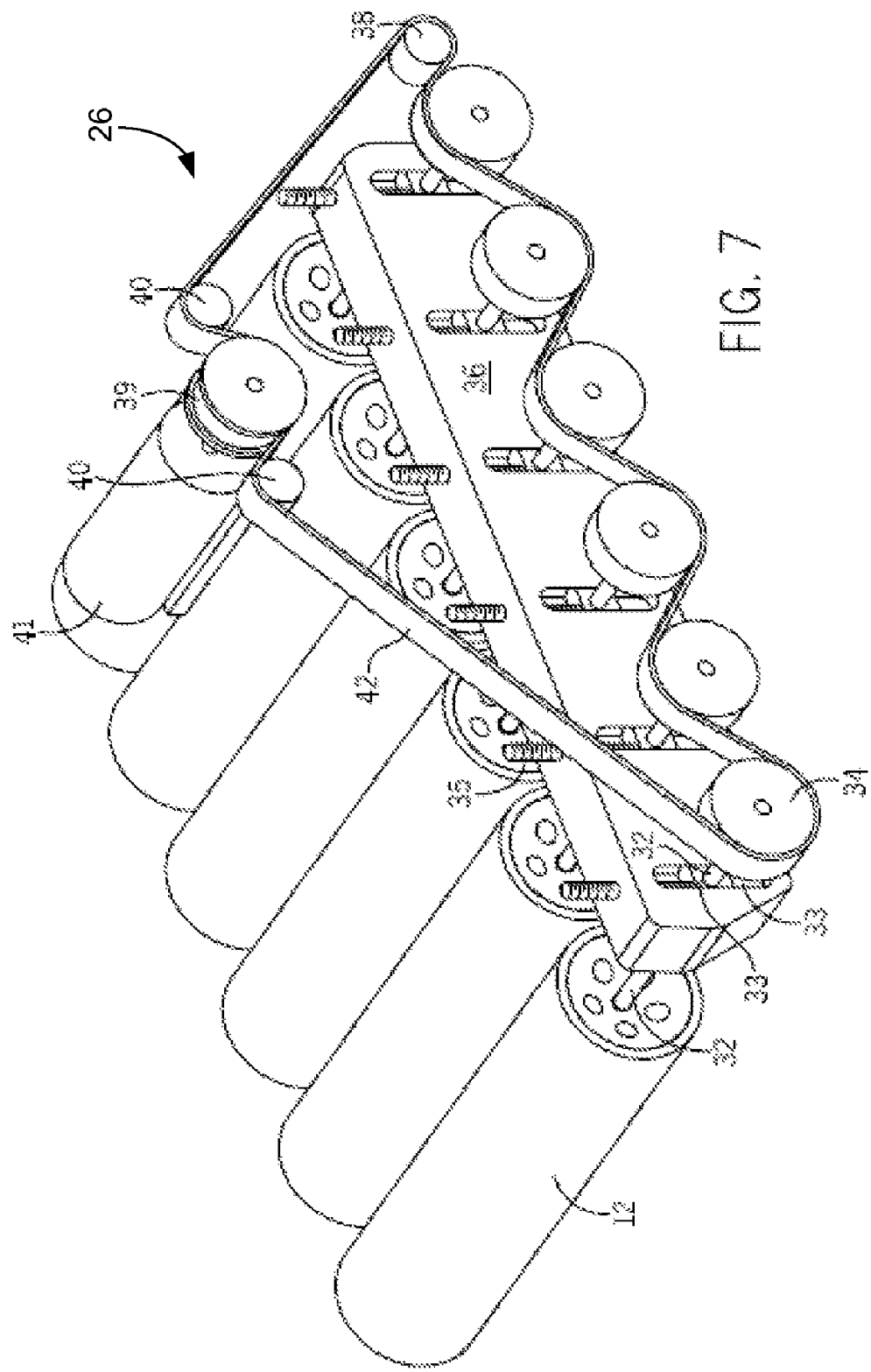
FIG. 7 is a perspective view of a drive mechanism for a sanding and/or filing apparatus, in accordance with various embodiments of the present invention.
Figure 8:
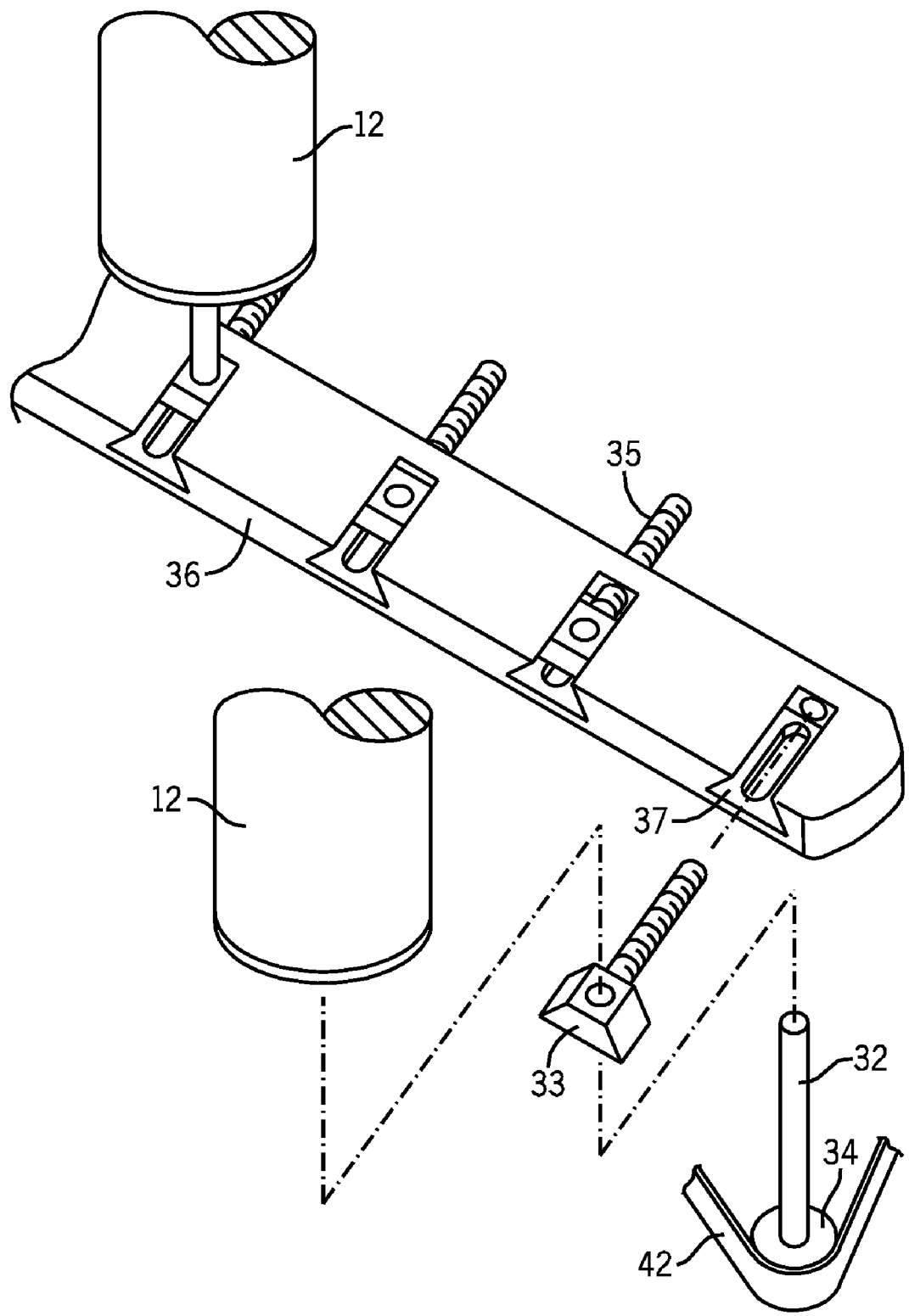
FIG. 8 is a partially exploded view of a drive mechanism for a sanding and/or filing apparatus, in accordance with various embodiments of the present invention.

FIGS. 7 and 8 illustrate one possible embodiment of the drive mechanisms that utilizes a belt-and-pulley drive system. It should be appreciated that the embodiment illustrated in FIGS. 7 and 8 is exemplary, and other embodiments are not so limited. By way of example, and not limitation, the drums 12 could instead be driven using shafts and gears, rather than belts and pulleys.

In the illustrated embodiment, each drum 12 is solidly attached to an axle 32. Each axle slides thru an axle support 33, which is disposed within a support frame rail 36. In one embodiment, the axle support 33 is toleranced so as to support the drum 12 from one end. Disposed at one end of the axle 32 is a pulley 34, which, together with belt 42, drives the axle 32 and, in turn, the corresponding drum 12.

Each axle support 33 is coupled to the support frame rail 36 via a slide 37, which permits the height of the drum 12 to be adjusted vertically, while also keeping the associated drum 12 aligned. The sliding support 37 may include a threaded shaft 35 extending vertically therefrom. In one embodiment, turning the threaded shaft will adjust the height of the roller in a manner to a simple screw jack. A lock nut can optionally be used to lock the height of the slider 37.

It should be appreciated that driving the drums 12 can be achieved in a number of ways. For example, the illustrated embodiment of FIGS. 7 and 8 utilizes a single motor 41 and a multi-pulley belt system. As shown, a flat belt 42 can be woven between the pulleys 34 to thereby engage each of the pulleys 34. This weaving will cause adjacent rollers to turn in opposite directions. In one embodiment, the drive mechanism may include one or more idler pulleys 38 to ensure the pulleys 34 of one or more end drums have sufficient belt wrap for engagement.

In the illustrated embodiment, the drive motor 41 is mounted above the drums 12, for example, within housing 24. Spring-loaded idlers 40 may be provided to ensure the belt 42 stays tight as the roller heights are adjusted or as the belt 42 naturally stretches over time. It should be appreciated that other embodiments may utilize multiple motors.

Thus, embodiments provide for a multi-drum, hand-held sanding apparatus that may be re-configured into different sanding tools, such as a drum sander and a power rasp. Such an apparatus according to various embodiments would be significantly more portable when compared to conventional sanding apparatuses. Embodiments that employ suspended drums provide added versatility because they can be more effective than conventional sanding apparatuses on non-planar surfaces. Still further, various embodiments are safer and easier to use than conventional sanding apparatuses which use a single drum.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multi-purpose sanding or filing apparatus, comprising:
   a motor;
   a plurality of drive mechanisms in mechanical communication with the motor; and
   a plurality of drums, each of the drums having an axis passing therethrough, wherein the drums are coupled with respective drive mechanisms and the drive mechanisms are operable to rotate the drums about their respective axes, and
   wherein the drive mechanisms are individually suspended in a manner that allows them to freely move between a first vertical position and a second vertical position.

2. The multi-purpose sanding or filing apparatus as recited in claim 1, wherein at least one the plurality of drums comprises a sander drum.

3. The multi-purpose sanding or filing apparatus as recited in claim 1, wherein the drums are interchangeable to permit different types of drums to be coupled with the drive mechanisms.

4. The multi-purpose sanding or filing apparatus as recited in claim 1, wherein at least one of the drive mechanisms comprises a solid shaft.

5. The multi-purpose sanding or filing apparatus as recited in claim 1, wherein at least one of the drive mechanisms comprises a pneumatic cylinder.

6. The multi-purpose sanding or filing apparatus as recited in claim 1, wherein the drive mechanisms are individually suspended in a manner that allows them to be fixed in a vertical direction.

7. The multi-purpose sanding or filing apparatus as recited in claim 1, wherein the drive mechanisms are individually suspended in a manner that allows them to freely move in a vertical direction to adjust to a contour of a workpiece.

8. The multi-purpose sanding or filing apparatus as recited in claim 1, wherein at least one of the drive mechanisms is switchable between rotating the corresponding drum in a first rotational direction and a second rotational direction.

9. The multi-purpose sanding or filing apparatus as recited in claim 8, wherein the at least one drive mechanism is switchable independent of the other drive mechanisms.

10. The multi-purpose sanding or filing apparatus as recited in claim 1, wherein at least one of the drive mechanisms is operable to rotate its corresponding drum in a first rotational direction while another of the drive mechanisms rotates its corresponding drum in a second rotational direction.

11. A multi-purpose sanding or filing system for sanding or filing a workpiece, the system comprising:
- a first set of drums;
- a second set of drums;
- a handheld sanding apparatus, comprising:
  - a motor; and
  - a plurality of drive mechanisms in mechanical communication with the motor and suspended in a manner that allows them to freely move between a first vertical position and a second vertical position to adjust to a contour of the workpiece,
- wherein each of the drums has an axis passing therethrough,
- wherein the first and second sets of drums are interchangeably coupleable with respective drive mechanisms, and
- wherein the drive mechanisms are operable to rotate the attached set drums about their respective axes.

12. The multi-purpose sanding or filing system as recited in claim 11, wherein the first set of drums comprises sanding drums and the second set of drums comprises rasp drums.

13. The multi-purpose sanding or filing system as recited in claim 11, wherein at least one of the drive mechanisms is switchable between rotating the corresponding drum in a first rotational direction and a second rotational direction.

14. The multi-purpose sanding or filing system as recited in claim 13, wherein the at least one drive mechanism is switchable independent of the other drive mechanisms.

15. The multi-purpose sanding or filing system as recited in claim 11, wherein at least one of the drive mechanisms is operable to rotate its corresponding drum in a first rotational direction while another of the drive mechanisms rotates its corresponding drum in a second rotational direction.

* * * * *